(12) United States Patent
Lee

(10) Patent No.: US 8,059,211 B2
(45) Date of Patent: Nov. 15, 2011

(54) SYSTEM AND METHOD FOR CHANGING TELEVISION CHANNELS IN A VIDEO SIGNAL PROCESSOR

(75) Inventor: Janghwan Lee, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1359 days.

(21) Appl. No.: 11/629,543

(22) PCT Filed: May 24, 2005

(86) PCT No.: PCT/US2005/018202
§ 371 (c)(1),
(2), (4) Date: Dec. 13, 2006

(87) PCT Pub. No.: WO2005/125192
PCT Pub. Date: Dec. 29, 2005

(65) Prior Publication Data
US 2008/0018796 A1 Jan. 24, 2008

Related U.S. Application Data

(60) Provisional application No. 60/579,583, filed on Jun. 14, 2004.

(51) Int. Cl.
*H04N 5/50* (2006.01)
*H04N 3/24* (2006.01)
(52) U.S. Cl. ........................................ 348/731; 348/635
(58) Field of Classification Search .................. 348/635, 348/725, 731–733; 725/38; *H04N 5/44, H04N 3/24, 5/50*
See application file for complete search history.

(56) References Cited

U.S. PATENT DOCUMENTS 3,707,597 A 12/1972 Lunn
4,330,792 A 5/1982 Naimpally
(Continued)

FOREIGN PATENT DOCUMENTS

CN 1298259 A 6/2001
(Continued)

OTHER PUBLICATIONS

Hurst et al., MPEG Splicing: A New Standard for Television—SMPTE 312M, SMPTE Journal, Nov. 1998.
(Continued)

*Primary Examiner* — Sherrie Hsia
(74) *Attorney, Agent, or Firm* — Robert D. Shedd; Joseph J. Opalach; Catherine A. Cooper

(57) ABSTRACT

A system and/or method that reduces the blanking time between changing from one video channel to another video channel, particularly from a digital video channel. The system provides as much video of the old video channel as possible for display until video from the new channel is acquired. Particularly, video output signal from the old channel which is stored in a video packet buffer is provided until the video packet buffer is underflowed (underflow condition or event). This is accomplished while the system is acquiring the new video channel (i.e. the selector in the case of an analog or different frequency digital video channel, or a PID filter of an MPEG transport stream decoder thereof in the case of a digital video subchannel of the old digital video channel). Blanking of the video output may or may not be accomplished if the new video is acquired before an video packet buffer underflow condition or event, else blanking may occur for only a short period of time. This can save about 400-500 ms.

18 Claims, 3 Drawing Sheets

U.S. PATENT DOCUMENTS

| | | | |
|---|---|---|---|
| 4,535,352 A | 8/1985 | Haskell | |
| 4,622,578 A | 11/1986 | Rzeszewski | |
| 4,633,293 A | 12/1986 | Powers | |
| 4,688,082 A | 8/1987 | Kato | |
| 4,980,767 A | 12/1990 | Chao et al. | |
| 5,450,549 A | 9/1995 | Casparian | |
| 5,734,432 A | 3/1998 | Netravali et al. | |
| 5,754,253 A | 5/1998 | Lee | |
| 5,761,210 A | 6/1998 | Claydon et al. | |
| 5,793,436 A * | 8/1998 | Kim | 348/447 |
| 6,115,080 A | 9/2000 | Reitmeier | |
| 6,385,773 B1 | 5/2002 | Schwartzman et al. | |
| 6,441,868 B1 * | 8/2002 | Park | 348/633 |
| 6,487,719 B1 * | 11/2002 | Itoh et al. | 725/17 |
| 6,598,233 B1 * | 7/2003 | Choi | 725/151 |
| 6,985,188 B1 * | 1/2006 | Hurst, Jr. | 348/553 |
| 7,589,789 B2 | 9/2009 | Choi | |
| 2001/0010750 A1 | 8/2001 | Setoguchi et al. | |
| 2001/0037512 A1 * | 11/2001 | Flickner et al. | 725/131 |
| 2002/0057891 A1 * | 5/2002 | Shigaki | 386/1 |
| 2003/0226153 A1 | 12/2003 | Bessel et al. | |
| 2004/0098739 A1 * | 5/2004 | Rakib | 725/15 |

FOREIGN PATENT DOCUMENTS

| | | |
|---|---|---|
| EP | 1107601 | 6/2001 |
| JP | 62013174 | 1/1987 |
| JP | 2001292381 | 10/2001 |
| JP | 2002051325 | 2/2002 |

OTHER PUBLICATIONS

Search Report dated Sep. 15, 2005.

* cited by examiner

SYSTEM AND METHOD FOR CHANGING TELEVISION CHANNELS IN A VIDEO SIGNAL PROCESSOR

This application claims the benefit, under 35 U.S.C. §365 of International Application PCT/US2005/018202, filed May 24, 2005, which was published in accordance with PCT Article 21(2) on Dec. 29, 2005 in English and claims priority of 60/579,583 filed Jun. 14, 2004.

BACKGROUND OF THE INVENTION

1. Field of the Invention

The present invention relates to a method and apparatus for processing video signals and, more particularly, to a method and apparatus for changing from one television channel to another television channel.

2. Background Information

When changing television channels, there is a period of time between the receipt of the command to change the channel and the providing of the newly acquired channel. Thus, there is a period of time during which video blanking occurs. This period of time or latency is due to several factors. The most significant factor is the time it takes the television channel tuner to tune to or acquire the new channel.

Because users want to see the newly selected channel as fast as possible, most channel changing schemes concentrate on shortening tuner response time. While these schemes are somewhat effective, there is still a period of time to wait and blank the screen in order to avoid displaying broken macro-blocks or errors on the screen during the channel change.

Typically, when a channel change is being effected, the video is first blanked while the tuning frequency of the tuner is changed. Once the new channel is acquired, the video output is then unblanked. This prevents the user from seeing the abnormal behavior such as broken macro-blocks, color mismatch and/or the like during channel change. This blanking period, however, may seem too long before the new channel is displayed.

It is, therefore, evident from the above discussion that what is needed is a video signal processor that reduces blanking time between changing from one television channel to another television channel.

It is, therefore, further evident from the above discussion that what is needed is a video signal processor that provides as small a video interruption as possible during a television channel change.

These needs and others are accomplished through application of the principles of the subject invention and/or as embodied in one or more various methods, form and/or systems such as are shown and/or described herein.

SUMMARY OF THE INVENTION

A system and method for reducing the blanking time between changing from one television channel to another television channel provides as much video of the old channel as possible until video from the new channel is acquired. This is accomplished with or without the aid of video blanking depending on tuning circumstances.

Particularly, video output signal representing the old channel which is stored in a video buffer is provided until the video buffer is underflowed (underflow condition or event). This is accomplished while the video signal processor is acquiring the new television channel (i.e. the tuner in the case of an analog or different frequency digital television channel, or a PID filter of an MPEG transport stream decoder thereof in the case of a digital television subchannel of the old digital television channel). Blanking of the video output may or may not be accomplished if the new video output signal is acquired before a video buffer underflow condition or event, else blanking may occur for only a short period of time. This can save about 400-500 ms.

In one form, the present invention provides a method of changing a television channel in a video signal processor. The method includes the steps of: (a) storing a video signal of a currently tuned digital television channel; (b) receiving a request to change from a currently tuned digital television channel to a new television channel; (c) tuning to the requested new television channel; (d) while tuning to the requested new television channel, providing video output signal representing the previously tuned digital television channel that is stored until a buffer underflow event occurs; (e) until the requested new television channel has been tuned, blanking video output if the buffer underflow event occurs, else providing video output signal representing the requested new television channel if the requested new television channel has been tuned; and (f) if the video output has been blanked, unblanking video output and providing video output signal representing the new television channel when the new television channel has been tuned.

In another form, the present invention provides a method of operating a video signal processor. The method includes the steps of: (a) storing digital television channel video packets of a currently tuned digital television channel in a video buffer; (b) receiving a request to acquire a new television channel; (c) attempting to tune to the requested new television channel; (d) while attempting to tune to the requested new television channel, providing the stored digital television channel video packets from the video buffer until a buffer underflow event occurs in the video buffer; (e) until the requested new television channel has been tuned, blanking video output if the video buffer underflow event occurs, else providing video output signal representing the requested new television channel if the requested new television channel has been tuned; and (f) if the video output has been blanked, unblanking video output and providing video output signal representing the new television channel when the new television channel has been tuned.

In another form, the present invention provides a video signal processor. The video signal processor includes a video signal tuner, an MPEG transport stream decoder connected to the video signal tuner, a video buffer connected to the MPEG transport stream decoder, a processor connected to and controlling the video signal tuner, the MPEG transport stream decoder and the video buffer, and program instructions associated with the processor. The program instructions are operative to cause the processor to: (a) store a video signal of a currently tuned digital television channel; (b) receive a request to change from the currently tuned digital television channel to a new television channel; (c) cause the video signal tuner to attempt to tune to the requested new television channel; (d) while the video signal tuner is attempting to tune to the requested new television channel, cause the video buffer to provide digital television channel video packets from the previously tuned digital television channel until a buffer underflow event occurs in the video buffer; (e) until the requested new television channel has been tuned by the television signal tuner, causing blanking of a video output if the buffer underflow event occurs, else providing video output signal representing the requested new television channel if the requested new television channel has been tuned by the video signal tuner; and (f) if the video output has been blanked, causing unblanking of the video output and providing video output signal representing the new television channel when the new television channel has been tuned.

BRIEF DESCRIPTION OF THE DRAWINGS

The above mentioned and other features and objects of this invention, and the manner, of attaining them, will become more apparent and the invention itself will be better understood by reference to the following description of one embodiment of the invention taken in conjunction with the accompanying drawings, wherein.

Figure 1:
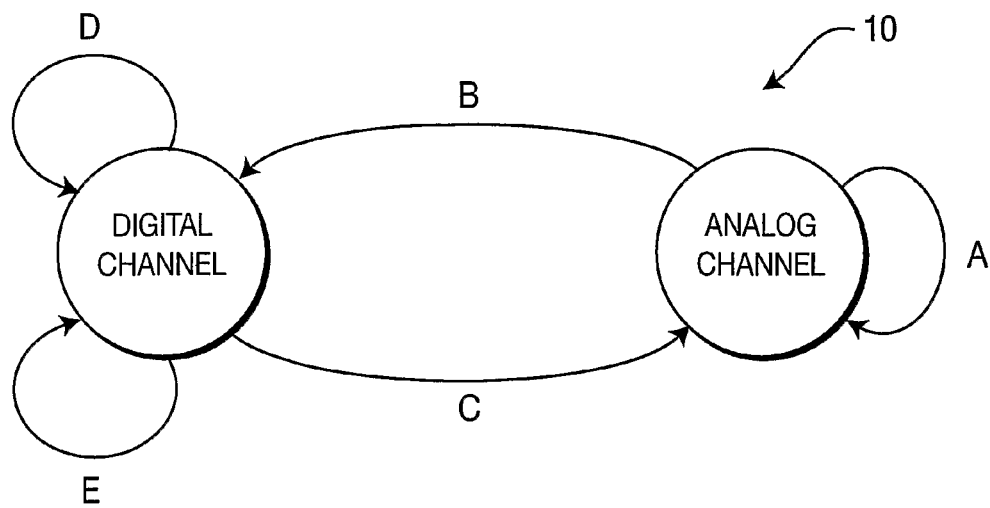
FIG. 1 is a state diagram of various manners of switching television channels.

Corresponding reference characters indicate corresponding parts throughout the several views. Although the drawings represent embodiments of the invention, the drawings are not necessarily to scale and certain features may be exaggerated in order to better illustrate and explain the present invention. The exemplification set out herein illustrates one embodiment of the invention, in one form, and such exemplification is not to be construed as limiting the scope of the invention in any manner.

DESCRIPTION OF THE PREFERRED EMBODIMENT

FIG. 1 depicts a state diagram, generally designated 10, illustrating the various channel changing states of a video signal processor/video signal tuner. State diagram 10 has two states, a digital channel state and an analog channel state. The digital channel and the analog channel represent the two possible tuning states of a video signal processor and/or tuner thereof (hereinafter, collectively video signal processor). Thus, the video signal processor can be tuned to a digital television channel or to an analog television channel.

The state diagram 10 illustrates the various transitions that can occur between the two tuning states. Particularly, transition A of state diagram 10 represents the situation, mode, state or case where an analog television channel has been selected for tuning and is being tuned when the video signal processor was tuned to an analog television channel. The new or currently being tuned analog television channel will replace the old or previously tuned analog television channel. This may be termed an analog to analog mode.

Transition B of state diagram 10 represents the situation, mode, state or case where a digital television channel has been selected for tuning and is being tuned when the video signal processor was tuned to an analog television channel. The new or currently being tuned digital television channel will replace the old or previously tuned analog television channel. This may be termed an analog to digital mode.

Transition C of state diagram 10 represents the situation, mode, state or case where an analog television channel has been selected for tuning and is being tuned when the video signal processor was tuned to a digital television channel. The new or currently being tuned analog television channel will replace the old or previously tuned digital television channel. This may be termed a digital to analog mode.

Transition D of state diagram 10 represents the situation, mode, state or case where a digital television channel has been selected for tuning and is being tuned when the video signal processor was tuned to a digital television channel, and the physical frequency of the selected digital television channel for tuning is different than the currently tuned digital television channel. The new or currently being tuned digital television channel will replace the old or previously tuned digital television channel. The frequency and PIDs (packet identifiers) of the newly tuned digital television channel will be updated. This may be termed a digital to digital frequency and PED update mode.

Lastly, transition E of state diagram 10 represents the situation, mode, state or case where a digital television channel has been selected for tuning and is being tuned when the video signal processor was tuned to a digital television channel, and the selected digital television channel to be tuned is a subchannel of the currently tuned digital television channel (i.e. the physical frequency of the selected digital television channel to be tuned is the same as the currently tuned digital television channel). Only the PIDs of the newly tuned digital television channel will be updated. This may be termed a digital to digital PID update only mode.

Figure 2:
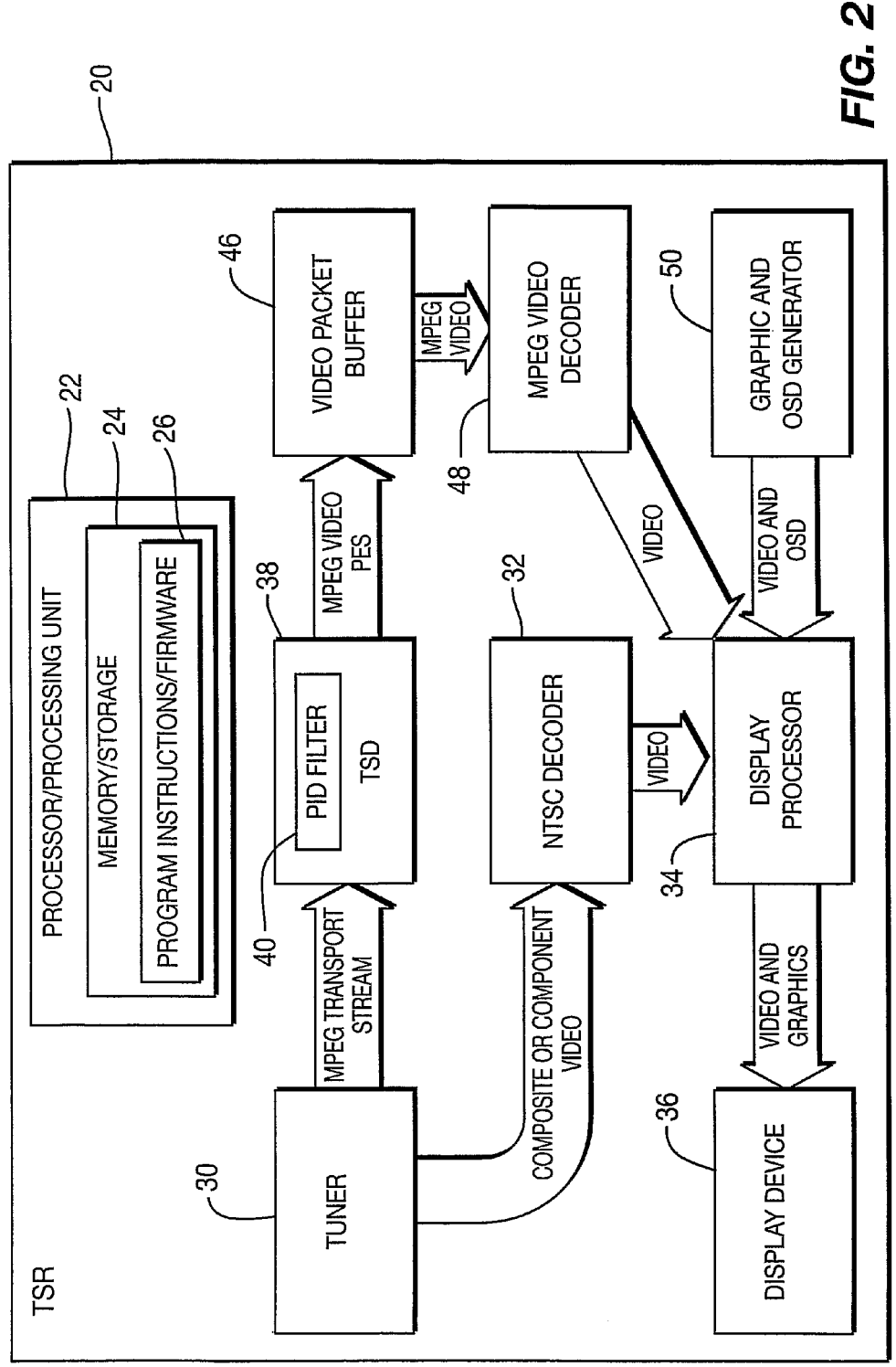
FIG. 2 is a block diagram of an exemplary video signal processor in accordance with the principles of the subject invention.

FIG. 2 depicts a block diagram of a video signal processor, generally designated 20, in which the subject invention may be embodied. The video signal processor 20 is operable to perform any one, all or select combination of transitions A, B, C, D and E. The video signal processor 20 is also operable, configured and/or adapted to perform in the manner described herein. The video signal processor 20 is particularly representative of a television but may include any type of video signal processor that includes a tuner for tuning to a particular television channel such as a VCR, DVD, set top box, DVR, or the like.

Initially, it should be appreciated that the video signal processor 20 includes a processing unit or processor 22 and memory or storage 24 that maintains or stores program instructions, firmware, software or the like 26 for carrying out the various features and/or functions of a typical video signal processor and/or the particular features, functions and/or operation as described herein. The processor 22 may contain a variety of processing units such as digital signal processors and the like that together function to control and/or operate the various video signal processor components as is known in the art and as described herein, both those shown and/or described herein and those that are not but which are typical and/or necessary for general video signal processor operation. As an example of a component or components not shown, but typically a part of a video signal processor, is a remote control signal receiver (remote receiver) and corresponding remote control signal generator (remote). The remote and remote receiver are typically infrared (IR) based and through which a user selects a television channel.

The video signal processor 20 includes a tuner 30 that is operable, configured and/or adapted to tune to a particular television signal frequency such as is known in the art. The tuned frequency may be a digital television channel or an analog television channel. The video signal processor 20 includes both analog television signal (e.g. NTSC) processing and digital television signal (MPEG) processing. The video signal processor 20 may perform only digital television signal processing.

The video signal processor 20 includes an NTSC decoder 32 that receives a composite or component video signal from the tuner 30 in the case of an analog television channel being tuned. The NTSC decoder 32 is operable, configured and/or adapted to provide a video signal to a display processor 34.

The display processor 34 is operable, configured and/or adapted to receive graphics and/or OSD (on-screen display) data from a graphics and OSD generator 50. The graphics and OSD generator 50 is operable, configured and/or adapted to provide graphics and OSD data as appropriate to the display processor 34. The display processor 34 is further operable, configured and/or adapted to provide a video and graphics signal to a display device 36 that is suitable for display on the display device 36.

The video signal processor further includes a transport stream decoder (TSD) 38 that is operable, configured and/or adapted to receive an MPEG transport stream from the tuner 30 in the case of a digital television channel being tuned. The TSD 38 is operable, configured and/or adapted to decode the MPEG transport stream and provide an MPEG video PES (packet elementary stream) to a video packet or channel buffer 46. The TSD 38 includes a PID filter 40 that is operable, configured and/or adapted to filter out or acquire appropriate data from the MPEG transport stream according to the requested packet identifiers (PIDs).

When a new channel request is received, and the tuner 30 is acquiring a new television channel, the video packet buffer 46 is also operable to provide video data from the old television channel that is has stored therein until a buffer underflow condition or event occurs. When the new television channel is acquired the video packet buffer 46 may begin storing the new channel video therein, in the case of a digital television channel being tuned, or may not in the case of an analog television channel being tuned. The PID filter 40 may change as appropriate to acquire the selected new digital television channel.

The video packet buffer 46 is operable, configured and/or adapted to provide buffered MPEG video to an MPEG video decoder 48. The MPEG video decoder 48 is operable, configured and/or adapted to decode the MPEG video from the video packet buffer 46 and provide the decoded video output signal to the display processor 34 for display on the display device 36.

The video signal processor is operative to blank the video output, tune to a new channel via the tuner 30, and unblank the video output 36. In accordance with the principles of the subject invention, when tuning from a digital channel to a new channel (digital or analog), the video output signal from the old channel that is stored in the video packet buffer 46 is provided (through the various data processing blocks as described above) until a buffer underflow condition or event of the video packet buffer 46 is reached. In the case of changing from a digital channel, the video output will not be blanked until either the buffer underflow condition is reached or the tuner acquires the new television channel.

In the case that the new television channel is acquired before a buffer underflow condition is reached, blanking is almost instantaneous (i.e. relatively short), since the new video output signal is ready the moment the old video is blanked. In the case that the new television channel is acquired after the buffer underflow condition, the old video output signal has been provided for a period of time longer than just initially blanking the old video output signal before starting to acquire the new video. This provides a 400-500 ms time savings.

Figure 3:
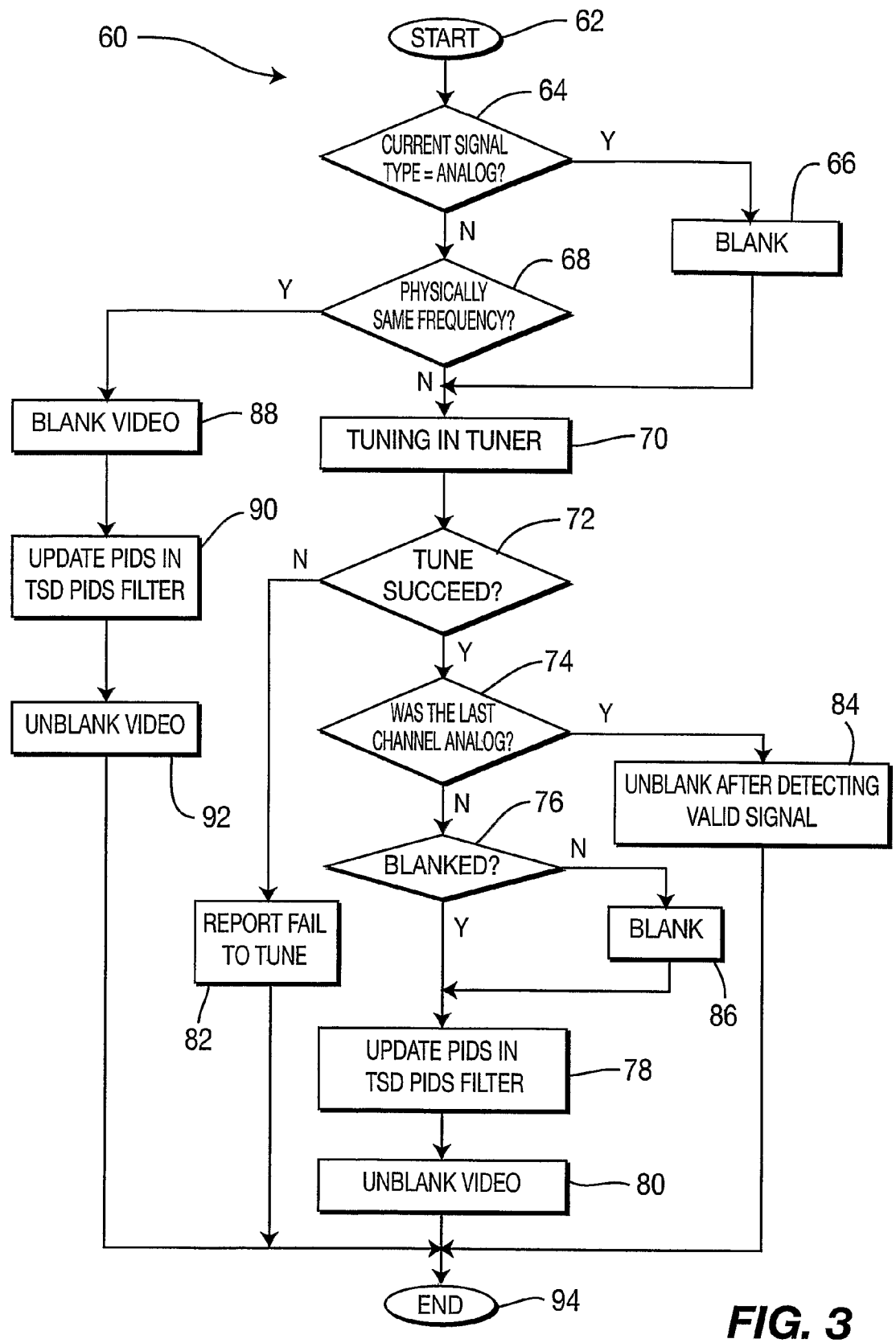
FIG. 3 is a flowchart of a manner of changing television channels in accordance with the principles of the subject invention.

Referring to FIG. 3, there is depicted a flowchart, generally designated 60, illustrating an exemplary program flow for the video signal processor 20 in accordance with the principles of the subject invention. Essentially, the program flow 60 provides a manner for operating the video signal processor 20 during execution of a channel change. The program flow 60 will be described in connection with the five program change modes: i.e. 1) the analog to analog mode, transition A; 2) the analog to digital mode, transition B; 3) the digital to analog mode, transition C; 4) the digital to digital frequency and PID update mode, transition D; and 5) the digital to digital PID update only mode. Each channel change mode begins with "main" or step 62 which signifies the beginning of the routine. As such, step 62 will not be mentioned during discussion of each channel change mode.

With respect to the analog to analog mode, in step 64, it is determined whether the current television signal type (i.e. the channel to which the video signal processor is currently tuned) is analog. If yes (Y), then the video output is blanked, step 66. Thereafter, step 70, the selected analog television channel is tuned in the tuner. In step 72, it is determined whether the tuning was successful. If no (N), then a fail to tune is reported in step 82 and the program ends 94. If yes (Y), then it is determined in step 74 whether the last channel was analog. If yes (Y), then in step 84 the video output is unblanked after a valid analog television signal is detected. This may entail detecting a valid sync signal in the tune analog television channel. Thereafter, in step 94 the program ends. An analog channel has thus been tuned from an analog channel.

With respect to the analog to digital mode, in step 64 it is determined whether the current television signal type is analog. If yes (Y), then the video output is blanked, step 66. Thereafter, in step 70, the selected digital television channel is tuned in the tuner. In step 72 it is determined whether the tuning was successful. If no (N), then a fail to tune is reported in step 82 and the program ends 94. If yes (Y), then it is determined in step 74 whether the last channel was analog. If yes (Y), then in step 84 the video output is unblanked after a valid digital television signal is detected. Thereafter, in step 94 the program ends. A digital channel has thus been tuned from an analog channel.

With respect to the digital to analog mode, in step 64 it is determined whether the current television signal type is analog. If no (N), then it is determined, in step 68, whether the physical frequency of the channel being tuned is the same as the physical frequency of the previous channel. If no (N), then in step 70, the selected analog channel is tuned by the tuner. In step 72 it is determined whether the tuning was successful. If no (N), then a fail to tune is reported in step 82 and the program ends 94. If yes (Y), then it is determined in step 74 whether the last channel was analog. If no (N), then it is determined in step 76 whether the video signal has been blanked. If the video signal has not been blanked (N for no), then in step 86, the video signal is blanked and program flow proceeds to step 78 wherein the PIDs in the TSD PID filter (see FIG. 2) are updated. If the video signal has been blanked (Y for yes), then in step 78, PIDs in the TSD PID filter (see FIG. 2) are updated. Thereafter, in step 80, the video output is unblanked, and the program ends 94.

While it appears that there is no case in program flow 60 wherein the video output is blanked when starting from a digital channel and going to an analog channel, blanking may occur by the program flow 100 of FIG. 4 as described below, which is run concurrently with the present program flow 60. Thus, in step 76, the answer to the determination of whether the video output has been blanked may be yes (Y) because blanking has occurred by program flow 100, i.e. during a channel buffer underflow event.

With respect to the digital to digital frequency and PID update mode (i.e. going from a digital channel to a digital channel of another frequency), in step 64 it is determined whether the current television signal type is analog. If no (N), then it is determined in step 68 whether the physical frequency of the channel being tuned is the same as the physical frequency of the previous channel. If no (N), then in step 70, the selected digital channel is tuned by the tuner. In step 72 it is determined whether the tuning was successful. If no (N), then a fail to tune is reported in step 82 and the program ends 94. If yes (Y), then it is determined in step 74 whether the last channel was analog. If no (N), then it is determined in step 76 whether the video output signal has been blanked. If the video output signal has not been blanked (N for no), then in step 86, the video output signal is blanked and program flow proceeds to step 78 wherein the PIDs in the TSD PID filter (see FIG. 2) are updated. If the video output signal has been blanked (Y for yes), then in step 78, PIDs in the TSD PID filter (see FIG. 2) are updated. Thereafter, in step 80, the video output is unblanked, and the program ends 94.

While it may appear that there is no case in program flow 60 wherein the video output is blanked when starting from a digital channel and going to a digital channel of a different frequency, blanking may occur by the program flow 100 of FIG. 4 as described below, which is run concurrently with the present program flow 60. Thus, in step 76, the answer to the determination of whether the video output has been blanked may be yes (Y) because blanking has occurred by program flow 100, i.e. during a channel buffer underflow event.

Lastly, with respect to the digital to digital PID update only mode (i.e. going from a digital channel to a digital channel of the same frequency but having a different subchannel), in step 64 it is determined whether the current television signal type is analog. If no (N), then it is determined in step 68 whether the physical frequency of the channel being tuned is the same as the physical frequency of the previous channel. If yes (Y), then in step 88 the video output is blanked. In step 90 the PIDs in the TSD PIDs filter (see FIG. 2) is updated. In step 92, the video output is unblanked. Thereafter, in step 94, the program ends.

Figure 4:
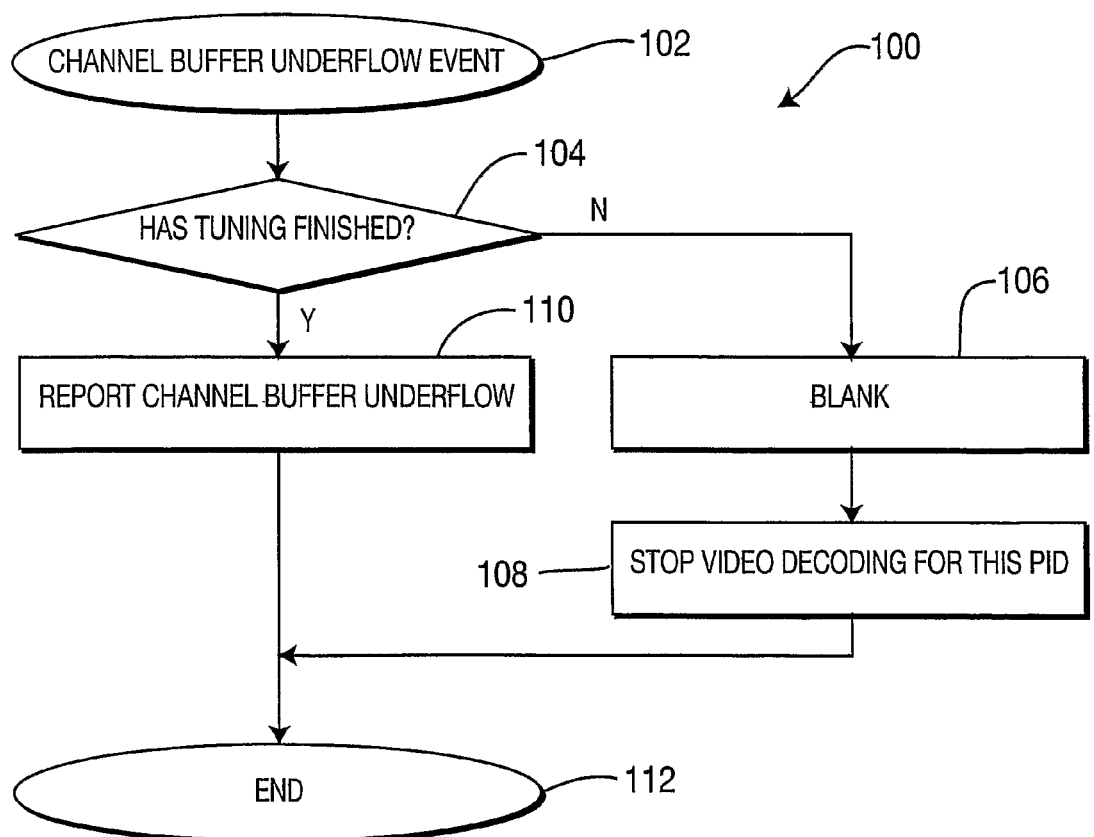
FIG. 4 is a flowchart of a channel buffer underflow event in accordance with the principles of the subject invention.

Referring to FIG. 4, there is depicted a flowchart, generally designated 100, illustrating an exemplary program flow for the video signal processor 20 in accordance with the principles of the subject invention. The program flow 100 is a program thread that is performed in parallel or concurrently with the program thread of program flow 60. The program flow 100 is a channel buffer underflow event signified as step 102. This may occur particularly with respect to the digital to analog mode, the digital to digital frequency and PID update mode, and the digital to digital PID only update mode. This does not occur when changing from an analog channel to an analog or digital channel, since there is no buffer for the analog television signal. Particularly, blanking of the video output is not accomplished until a buffer underflow condition In step 102, a channel buffer underflow event is detected. Thereafter, in step 104 it is determined whether tuning of the new channel has finished. If no (N), then in step 106 the video output is blanked. Thereafter, in step 108, video decoding is stopped for this PIDs, and the program flow ends 112. If, however, in step 104, tuning has finished (Y for yes), then in step 110 the channel buffer underflow event is reported and the program flow ends 112. The term "video signal processor: as used herein included video signal processing apparatus such as television (TV) receivers having a display screen (commonly called TV sets), TV receivers without a display screen such as video cassette recorders (VCRs), video cassette players (VCPs), set-top boxes (such as cable boxes and terms "turner" and "tuning" as used herein include selector and selecting.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claimed is:

1. A method of changing a video channel, said method comprising:
   storing a video signal of a currently selected digital video channel;
   receiving a request to change from said currently selected digital video channel to a new video channel;
   selecting the requested new video channel; and
   while acquiring the requested new video channel, providing an output video signal representing the stored previously selected digital video channel until a buffer underflow event occurs.

2. The method according to claim 1, wherein
   until the requested new video channel has been selected, blanking video output if the buffer underflow event occurs, else providing video output signal representing the requested new video channel if the requested new video channel has been selected; and
   if the video output has been blanked, unblanking video output and providing video output signal representing the new video channel when the new video channel has been selected.

3. The method of claim 2, wherein unblanking video output and providing video output signal representing the new video channel when the new video channel has been selected includes unblanking video output and providing video output signal representing the new video channel when the new video channel has been selected as indicated by determining a valid signal parameter of the new video channel.

4. The method of claim 3, wherein the valid signal parameter of the new video channel comprises a sync signal in the case of an analog video channel and comprises a valid PID in the case of a digital video channel.

5. The method of claim 1, wherein receiving said request to change from said currently selected digital video channel to said requested new video channel includes receiving a request to change from said currently selected digital video channel to said requested new video channel that is one of a new digital video channel and a new analog video channel.

6. The method of claim 1, wherein receiving a request to change from said currently selected digital video channel to said requested new video channel includes a request to change from said currently selected digital video channel to a new digital video channel; and
   selecting the requested new video channel includes changing a PID filter in an MPEG transport stream decoder in the case of selecting the requested new digital video channel when the requested new digital video channel is a subchannel of the previously selected digital video channel, else changing a PID filter of the MPEG transport stream decoder and selector frequency when the requested new digital video channel is not a subchannel of the previously selected digital video channel.

7. A method of operating a video signal receiver, said method comprising:
   storing digital video channel video packets of the previously selected channel of a currently selected digital video channel in a video packet buffer;
   receiving a request to acquire a new video channel;
   attempting to select the requested new video channel; and while attempting to acquire the requested new video channel, providing the stored digital video channel video packets from the video packet buffer until a buffer underflow event occurs.

8. The method according to claim 7, wherein until the requested new video channel has been selected, blanking video output if the video packet buffer underflow event occurs, else providing video output signal representing the requested new video channel if the requested new video channel has been selected; and if the video output has been blanked, unblanking video output and providing video output signal representing the new video channel when the new video channel has been selected.

9. The method of claim 8, wherein unblanking video output and providing video output signal representing the new video channel when the new video channel has been selected includes unblanking video output and providing video output signal representing the new video channel when the new video channel has been selected as indicated by determining a valid signal parameter of the new video channel.

10. The method of claim 9, wherein the valid signal parameter of the new video channel comprises a sync signal in the case of an analog video channel and comprises a valid PID in the case of a digital video channel.

11. The method of claim 7, wherein receiving said request to acquire said requested new video channel includes receiving a request to acquire a new video channel that is one of a new digital video channel and a new analog video channel.

12. The method of claim 7, wherein receiving a request to acquire said requested new video channel includes a request to acquire a new digital video channel; and attempting to select the requested new video channel includes changing a PID filter of the MPEG transport stream decoder in the case of attempting to select the requested new digital video channel when the requested new digital video channel is a subchannel of the previously selected digital video channel, else changing the PID filter of the MPEG transport stream decoder and selector frequency when the requested new digital video channel is not a subchannel of the previously selected digital video channel.

13. A video signal processor comprising:

a video signal selector;

an MPEG transport stream decoder connected to said video signal selector;

a video packet buffer connected to said MPEG transport stream decoder;

a processor connected to and controlling said video signal selector, said MPEG transport stream decoder and said video packet buffer; and program instructions associated with said processor and operative to cause said processor to:

store a video signal of a currently selected digital video channel;

receive a request to change from said currently selected digital video channel to a new video channel;

cause said video signal selector to attempt to select the requested new video channel; and while the video signal selector is attempting to acquire the requested new video channel, cause said video packet buffer to provide digital video channel video packets from the previously selected digital video channel until a buffer underflow event occurs.

14. The video signal processor according to claim 13, wherein said program instructions associated with said processor are further operative to cause said processor to:

until the requested new video channel has been selected by said video signal selector, causing blanking of a video output if the buffer underflow event occurs, else providing video output signal representing the requested new video channel if the requested new video channel has been selected by said video signal selector; and if the video output has been blanked, causing unblanking of the video output and providing video output signal representing the new video channel when the new video channel has been selected.

15. The video signal processor of claim 13, wherein the program instructions further cause said processor to receive said request to change said requested new video channel that is one of a new digital video channel and a new analog video channel.

16. The video signal processor of claim 13, wherein the program instructions further cause said processor to unblank the video output and provide video output signal representing the new video channel when the new video channel has been selected by said video signal selector as indicated by determining a valid signal parameter of the new video channel.

17. The video signal processor of claim 16, wherein the valid signal parameter of the new video channel comprises a sync signal in the case of an analog video channel and comprises a valid PID in the case of a digital video channel.

18. The video signal processor of claim 13, wherein the program instructions further cause said processor to receive said request to change said requested new video channel that includes a request to acquire a new digital video channel; and cause said video signal selector to attempt to select the requested new video channel by changing a PID filter of said MPEG transport stream decoder in the case of attempting to select the requested new digital video channel when the requested new digital video channel is a subchannel of the previously selected digital video channel, else by changing a PID filter of said MPEG transport stream decoder and selector frequency when the requested new digital video channel is not a subchannel of the previously selected digital video channel.

\* \* \* \* \*